C. J. AND C. T. A. SIBBALD.
FILM INDICATOR.
APPLICATION FILED MAR. 29, 1918.
1,303,732.
Patented May 13, 1919.
2 SHEETS—SHEET 1.
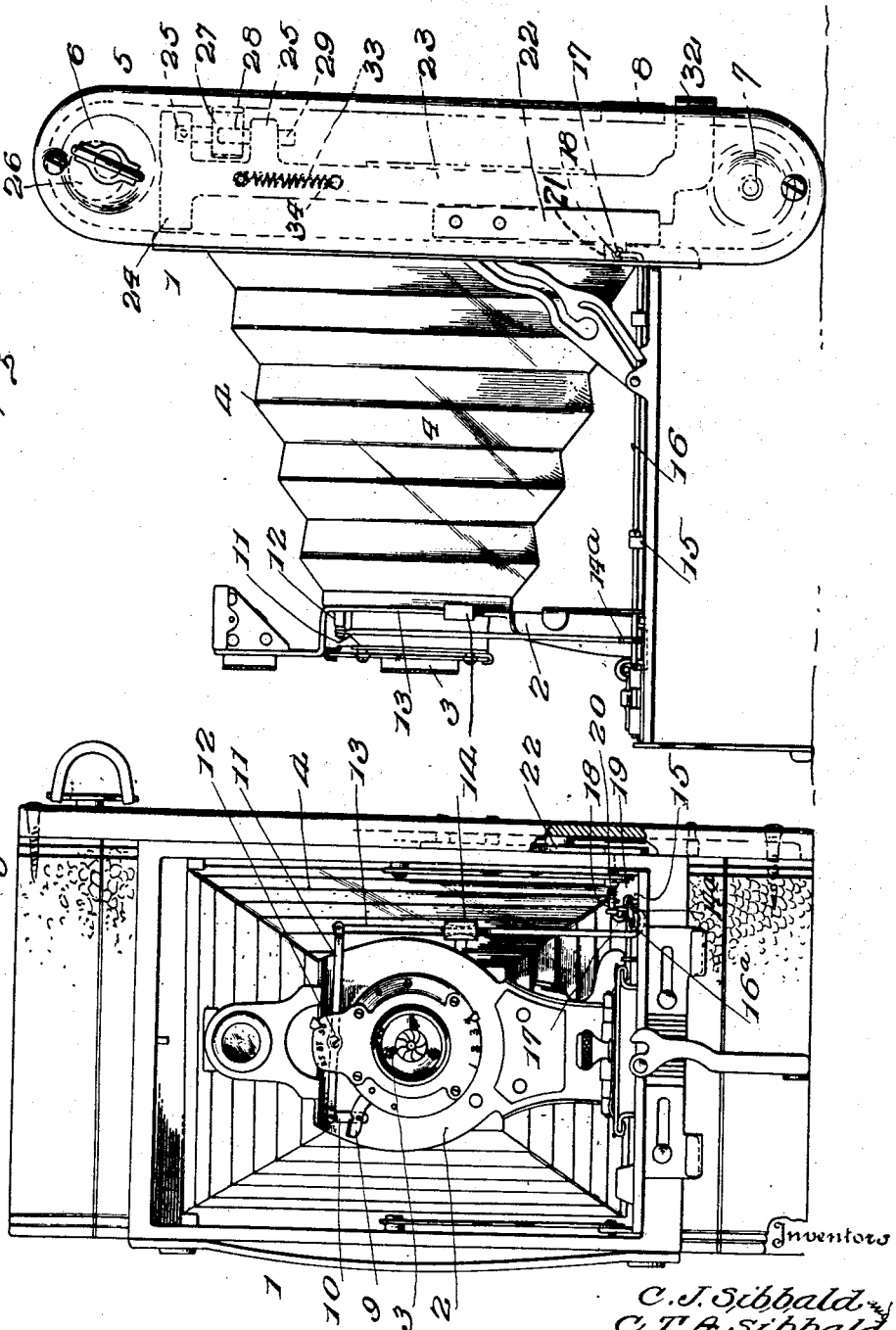
Inventors
C. J. Sibbald
C. T. A. Sibbald
By
Attorney

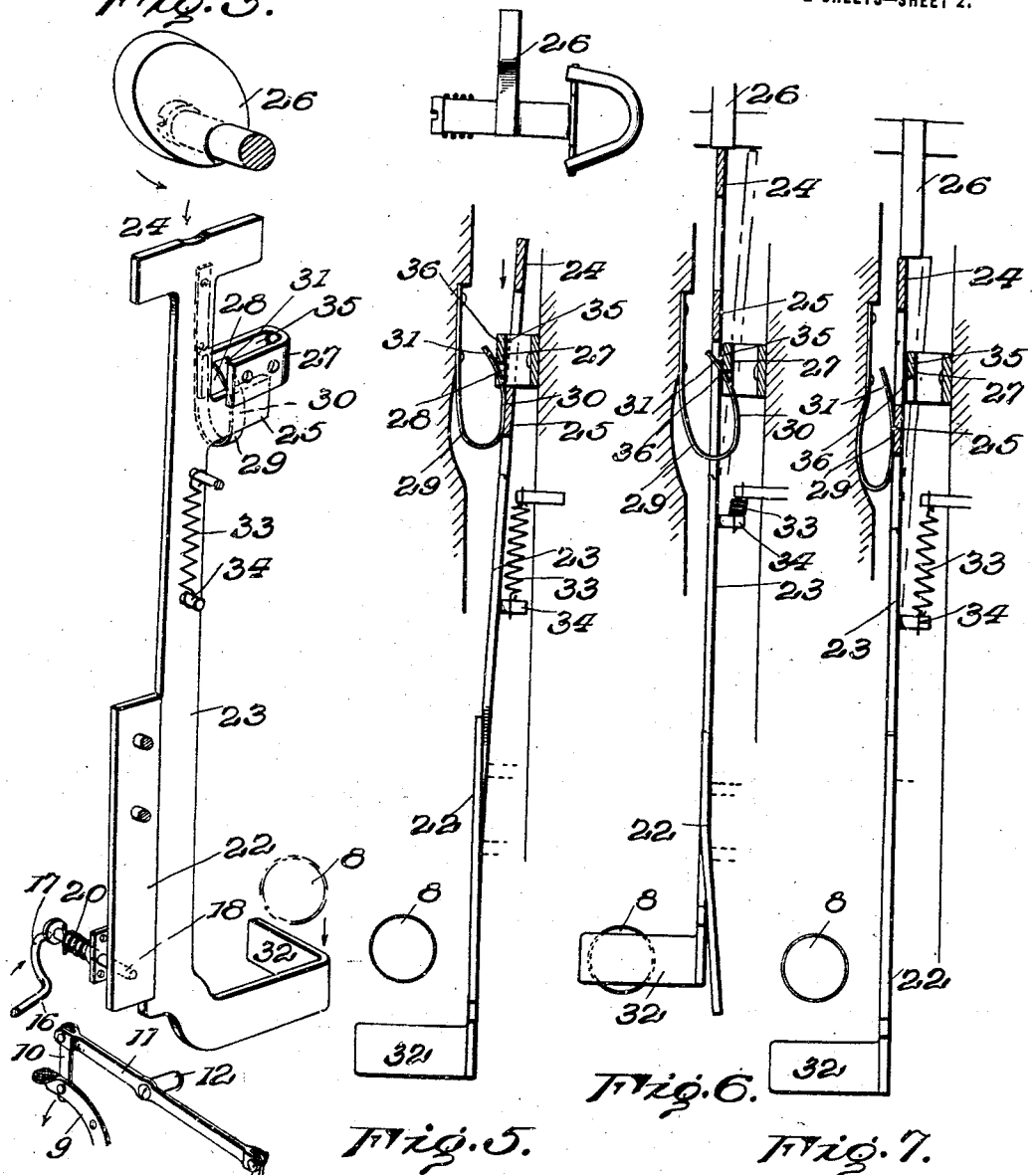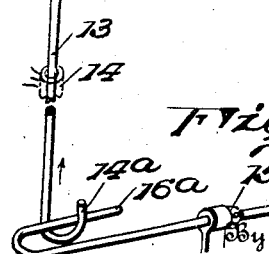

UNITED STATES PATENT OFFICE.

CHARLES J. SIBBALD AND CHARLES T. A. SIBBALD, OF TROY, NEW YORK.

FILM-INDICATOR.

1,303,732.   Specification of Letters Patent.   Patented May 13, 1919.

Application filed March 29, 1918. Serial No. 225,482.

*To all whom it may concern:*

Be it known that we, CHARLES J. SIBBALD and CHARLES T. A. SIBBALD, citizens of the United States of America, residing at Troy, in the county of Rensselaer and State of New York, have invented certain new and useful Improvements in Film-Indicators, of which the following is a specification.

This invention relates to means for visibly indicating whether or not a film has been exposed.

In cameras using films there is a sight opening through which a number on a film may be viewed to indicate to an operator if a certain film is properly positioned in rear of the lens. For convenience we make use of this opening to apply our indicator, without destroying its usefulness.

The object of this invention is to provide visible means for indicating to an operator if the film in rear of the lens has been exposed.

A further object of the invention is to provide means, actuated when the shutter is operated to expose a film, to dispose a visible indicator which remains set until the next unexposed film is moved in position behind the lens.

In its broadest aspect the object of the invention is to provide positive means for indicating if the film in rear of the lens is an exposed or unexposed film.

The invention also comprehends improvements in the construction and arrangement of parts which will be hereinafter described, and particularly pointed out in the claims.

In the accompanying drawings:—

Figure 1 is a front elevation of a folding camera with our attachment applied thereto.

Fig. 2 is a side elevation of the same.

Figs. 3 and 4 are detail perspective views of parts of the operating mechanism.

Fig. 5 is a detail section illustrating the position of the parts when set.

Fig. 6 is a similar view showing the indicator released and ready to be reset by the cam, the dotted lines illustrating the position of the resilient member prepartory to springing under the cam.

Fig. 7 is a similar view illustrating the resilient member depressed, and ready to be acted on by its spring to throw its end out of the path of the cam.

1 indicates a folding camera, including the usual folding front section 2, lens 3, bellows 4, film box 5, winding and unwinding spools 6 and 7, and sight opening 8, with a colored glass window.

These features are common in this type of camera, and specifically form no part of the present invention.

On the trigger 9, which operates the shutter, is pivoted the lower end of a link 10, and the upper end is pivoted to a lever 11, mounted to rock on a pivot 12. To the opposite end of the lever 11, is pivoted a vertical rod 13, which passes through a guide 14, to retain it in its operative position. The lower end of the rod 13, is bent upwardly to form a hook or an eye 14ª.

Mounted in bearings 15, on the front section 2, is a rod 16, the forward end thereof being bent rearwardly at 16ª to engage in the hook 14ª, when the bellows is extended. The rear end of this rod is bent upwardly and laterally to form a nose 17. This nose abuts against the head of a pin 18 slidably supported in a bearing 19, and normally pressed outwardly in direction of the nose by a light spring 20. The free end of the pin registers with a notch 21, formed in the frame of the camera, to coöperate with releasing mechanism, now to be described.

The releasing mechanism and the indicator are inclosed in a housing at the rear of the camera, as shown in the drawing. Secured in the housing is a resilient latch member 22. In the housing is a resilient vertical slidable member 23, the lower end of which is provided with a lip to coöperate with the latch 22, when the attachment is set. The upper end of the member 23, is extended laterally to form a cam lug 24 and below the top is another lateral lug 25. The lug 24, coöperates with a cam 26, fixed on the shaft which rotates the winding spool 6. The lug 25, coöperates with a fixed guide plate 27, provided with a notch 28, through which a flat spring 29, extends. The main portion 30, of spring 29, is normally flush with one surface of the plate 27, and at its free end it is bent in an incline direction through the notch 28, as shown at 31. The inclined portion 31, of the spring lies in one path of movement of the lug 25, to position the latter over the surface of the plate 27, as will presently appear. The spring is shown bent to provide convenient means for attaching it to the camera frame.

The lower end of the vertical slidable member 23 is provided with a lateral extension 32, adapted to be moved opposite the sight opening 8, a spring 33, engaging a pin 34, serving to move the member to its operative position.

When the bellows is extended, as shown in Figs. 1 and 2, of the drawings the hooked end 14ª of the rod 13 engages the bent end 16ª of the rod 16, the bent end 16ª being elongated to accommodate the usual adjustment at the front of the camera. If an unexposed film be located in rear of the lens, and the trigger 9 be depressed, the link 10 will rock the lever 11 and through the rod 13 the rod 16 will be rocked. This action will cause the nose 17 to engage the pin 18 and the inner end of the latter will impinge the latch 22 and release the vertical slidable member 23 and its spring 33 will immediately elevate it, and position the lateral extension, or indicator 32 across the sight opening 8. In the upward movement of the member 23, from the position shown in Fig. 2 the lug 25 will slide up against the face 35 of the plate 27 out of the path of the cam 26.

It may be stated at this time that the lug 25 is normally in the plane of the surface 36, of the plate 27, as shown in Figs. 6 and 7. Now when the bottom of the lug 25 reaches the top of the plate 27 as shown in Fig. 6 in dotted lines, it springs across the top edge in the plane of the opposite surface 36 of said plate, and into the path of the cam 26, as shown in said Fig. 6, or if the cam be in the way of the lug, the latter yieldingly engages same, until a further revolution is imparted, whereupon it will spring over into the path of the cam. When the parts are in the position as shown in Fig. 6, the extension 32 is positioned across the opening 8.

It is for this reason that the member 23 is formed of resilient material, for when the top of plate 27 is reached the lug 25, springs over, and is retained in this condition by the spring 33, until it is acted on by the cam.

It usually requires at least two, and at times a greater number of turns of the roll 6, to position a film in rear of the lens, the number of turns depending entirely on the size of the roll. Hence it is not possible to at all times determine just when the cam will be positioned with reference to the lug or head 24 of the member 23. It is for this reason that the mechanism for laterally shifting the upper end of the member 23 is provided. This mechanism acts similar to an escapement, in that its upper end moves in one path when moving down, and is shifted to move in another path when moving up.

The film having been exposed, and the extension or indicator 32, having been located across the opening 8, the parts remain in this position until the film is advanced. Hence, the operator need only glance at the opening to determine if the film has been exposed. The indicator is visible and the operator is apprised of the fact that the film behind the lens has been exposed. Now by turning the finger piece of the roll 6, the film is advanced after the usual fashion. In the rotation of the roll the cam will, if so positioned with respect to the lug 24, contact with the upper surface of the latter, and force the member 25, down against the tension of the spring 23, until the lip reaches the bottom of the latch, whereupon the latter springs over and holds it in set position, as shown in Fig. 2. As previously stated, if perchance the cam 26 is in the lateral path of the lug 24, it is only necessary to turn the roll 6 sufficiently to remove it, whereupon the member will, by its resiliency assume its proper position, as previously described.

When the lug 25, is depressed, its lower edge engages the inclined portion 31, of the spring and compresses same as shown in Fig. 7. Then when the top edge of the lug 25, reaches the bottom of the plate 27, the spring 29, forces the member 23, laterally and the lug 25, is positioned to ride up against the surface 35, as shown in Fig. 5.

From the foregoing description it will be seen that we have provided a simple and effective means for indicating if a film is exposed, and one which is operative by the shutter, and the actuation of the roll of films. It will also be seen that the indicator cannot be set or reset without movement of the film and without manipulating the shutter and subsequently advancing the film. Of course the film can be advanced independent of operation of the indicator, but this would be a useless waste of film.

While we have shown our attachment as applied to folding cameras, it is to be understood that this is merely illustrative. The attachment can be made separate to apply to cameras now in use, or it can be built in when the camera is manufactured.

What we claim as new is:—

1. In combination, a camera including a shutter operating device, a film roll, and an opening formed in the camera to normally expose to view a film in rear of the shutter, an indicator, spring actuated means for moving the indicator opposite the opening, a latch means operated by the shutter operating device to actuate the latch and to release the indicator, and means including a cam actuated when the film roll is operated to reset the indicator.

2. An attachment of the class described comprising a reciprocatory indicator to visibly indicate if a film has been exposed, said indicator having a laterally resilient stem, a fixed element to cause the stem to laterally yield when the indicator is moved in one direction, means to be operated by the shutter mechanism of a camera for releasing the indicator when a film is exposed, spring actuated means for moving the indicator in one direction when released, means including a cam actuated when an exposed film is advanced to move the indicator in the reverse direction and reset same, and means to laterally position the stem to be actuated by the cam.

3. In combination, a camera including a shutter and a film roll operating device, said camera having an opening through which the usual character on a film may be viewed to indicate the number of the film used, a movable indicator to indicate if a film has been exposed, said indicator being exposed adjacent the opening in the camera, a latch for holding the indicator in set position before exposure of the film, spring means operated by the shutter for releasing the latch, spring actuated means for operating the indicator to expose same to view after the latch is released, and means operated by the film roll operating device for resetting the latch and withdrawing the indicator from view when advancing the exposed film.

4. In combination, a camera including a shutter and a film roll operating device, a cam associated with the latter device, a movable element having an indicator, the cam actuating the movable element in one direction, means for actuating the movable device in the opposite direction, spring actuated means for positioning the cam actuated portion of the element out of the path of the cam when said element is moved in direction of the cam, a latch for holding the element in set position after actuation by the cam, and means actuated when the shutter is operated to release the latch and permit the indicator to be moved.

5. In combination a camera including a shutter and a film roll operating device, a cam rotatable with the latter device, a resilient member having a portion adapted to be engaged by the cam to move it in one direction a spring to move it in the opposite direction, a fixed plate, the resilient member having a lug which operates on opposite sides of the fixed plate, a spring with which the lug engages when the resilient member is moved by its spring whereby the lug is moved in direction of the cam, but out of its path until the opposite edge of the fixed plate is reached when the spring throws it in the path of the cam, an indicator carried by the resilient member, and means operated when the shutter is operated to release the resilient member to permit its spring to operate it toward the cam.

6. In combination, a camera formed with an opening, a shutter, film roll operating means, a cam carried by said means, an indicator moved in one direction by the cam, a spring for moving the indicator in the opposite direction adjacent the opening, a latch for holding the indicator in set position when moved by the cam, and means for causing the part of the indicator acted on by the cam to move in a path out of alinement with said cam when actuated by the spring to prevent said cam retarding the movement of the indicator when the latter is released.

7. In combination, a camera having an opening, a shutter, a film roll operating means, a reciprocable indicator, spring actuated means for moving the indicator in one direction of its reciprocation to expose the indicator through the opening, a cam operated by the film roll means to move the indicator in the opposite direction of its reciprocation to remove said indicator from the opening, means for guiding the indicator from the path of the cam to prevent striking same when the spring means moves said indicator, and means actuated by the shutter for releasing the indicator.

8. In combination, a camera having an opening, a shutter, a lever for operating the shutter, a film roll operating means, a reciprocable indicator, means associated with the indicator to move same in one direction of its reciprocation, a spring for moving the indicator in the opposite direction of its reciprocation, a latch for holding the indicator in position one side the opening, a trip adjacent the latch, and a loose connection between the lever and the trip to actuate the indicator when the shutter is operated.

9. In combination, a camera provided with an opening, a resilient reciprocable element having an indicator adapted to be moved adjacent the opening, a cam which acts on the reciprocable element, a spring acting to move the reciprocable element in one direction of the reciprocation, a guide to cause the reciprocable element to move out of the path of the cam to avoid striking same, a spring acting on the reciprocable element to direct the latter in the path of the guide, the reciprocable element springing into the path of the cam after passing the guide, and a latch for releasing the indicator when a film is exposed.

10. A device for indicating the exposure of a film in a camera, comprising a resilient reciprocable element having a visible indicator and a lug, a spring for moving the element in one direction of its reciprocation, a cam for moving the element in the opposite direction of its reciprocation, a guide with which the lug coöperates, a spring engaging the lug to hold same in position to coöperate with said guide, and a latch to release the reciprocable element, the reciprocable element in its movement being directed by the guide out of the path of the cam and by its resiliency springing into position to be acted on by said cam after passing the guide.

In testimony whereof we affix our signatures in the presence of two witnesses.

CHARLES J. SIBBALD.
CHARLES T. A. SIBBALD.

Witnesses:
JAMES FRANCIS MCGOWAN,
JOHN B. RANSOM.